(12) United States Patent
Li et al.

(10) Patent No.: US 12,153,583 B2
(45) Date of Patent: Nov. 26, 2024

(54) ASSOCIATING USER-PROVIDED CONTENT ITEMS TO INTEREST NODES

(71) Applicant: Pinterest, Inc., San Francisco, CA (US)

(72) Inventors: Chenyi Li, San Francisco, CA (US); Yunsong Guo, Santa Clara, CA (US); Yu Liu, Los Altos, CA (US)

(73) Assignee: Pinterest, Inc., San Francisco, CA (US)

( * ) Notice: Subject to any disclaimer, the term of this patent is extended or adjusted under 35 U.S.C. 154(b) by 605 days.

(21) Appl. No.: 16/578,166

(22) Filed: Sep. 20, 2019

(65) Prior Publication Data

US 2021/0089539 A1    Mar. 25, 2021

(51) Int. Cl.
| | |
|---|---|
| *G06F 16/2455* | (2019.01) |
| *G06F 16/23* | (2019.01) |
| *G06F 40/242* | (2020.01) |
| *G06F 40/284* | (2020.01) |
| *G06N 5/04* | (2023.01) |
| *G06N 20/00* | (2019.01) |

(52) U.S. Cl.
CPC .... *G06F 16/24558* (2019.01); *G06F 16/2379* (2019.01); *G06F 40/242* (2020.01); *G06F 40/284* (2020.01); *G06N 5/04* (2013.01); *G06N 20/00* (2019.01)

(58) Field of Classification Search
CPC .......... G06F 16/24558; G06F 16/2379; G06F 40/242; G06F 40/284; G06N 5/04; G06N 20/00; G06Q 30/0201
See application file for complete search history.

(56) References Cited

U.S. PATENT DOCUMENTS

| | | | |
|---|---|---|---|
| 2011/0072047 A1* | 3/2011 | Wang | G06F 16/58 |
| | | | 707/E17.071 |
| 2011/0125764 A1* | 5/2011 | Carmel | G06F 16/3338 |
| | | | 707/E17.014 |
| 2016/0034757 A1* | 2/2016 | Chhichhia | G06F 16/35 |
| | | | 382/206 |

(Continued)

OTHER PUBLICATIONS

Craven, M et al. "Learning to construct knowledge bases from the World Wide Web", Artificial Intelligence, Elsevier Science Publisher, vol. 118, Jan. 1, 2000, pp. 69-113.

(Continued)

*Primary Examiner* — Mark D Featherstone
*Assistant Examiner* — Samuel C Sharpless, III
(74) *Attorney, Agent, or Firm* — Athorus, PLLC (57) ABSTRACT

System and methods are presented for associating a user-posted content item with an interest node of an interest taxonomy. A corpus of content items and an interest taxonomy are maintained. The interest taxonomy comprises interest nodes organized in a hierarchical organization, each node having a text label descriptive of the interest node. Additionally, the content items of the corpus are associated with one or more interest nodes of the interest taxonomy. Upon receiving a user-posted content item, feature sets of the received content item are generated, these feature sets based on features and/or aspects of the received content item. After generating at least one feature set, the at least one feature set is provided to an interest prediction model that generates candidate interest nodes for the user-posted content item. At least some of the candidate interest nodes are associated with the user-posted content item in the corpus.

18 Claims, 8 Drawing Sheets

(56) References Cited

U.S. PATENT DOCUMENTS

| | | | |
|---|---|---|---|
| 2018/0060302 A1* | 3/2018 | Liang | G06F 16/35 |
| 2018/0253496 A1* | 9/2018 | Natchu | G06F 16/951 |
| 2019/0197105 A1 | 6/2019 | Tagra et al. | |

OTHER PUBLICATIONS

International Search Report and Written Opinion for International Application No. PCT/US2020/051651, dated Nov. 25, 2020, 14 pages.

* cited by examiner

ASSOCIATING USER-PROVIDED CONTENT ITEMS TO INTEREST NODES

BACKGROUND

Networked, online services are often offered as "free" services, meaning that the users or subscribers of a free online service do not pay a subscription fee for the available services. Instead, these online services finance their options by placing advertisements in the content that a user/subscriber views, and charging the advertiser for the advertisement placement, as well as any interaction and/or conversion that occurs due to the presentation of the advertisement to the user. In the world of ad-based financing, it is important for the online services to place advertisements of third parties to ensure that the advertisement is somehow relevant: e.g., relevant to the user, relevant to the user's actions, relevant to the subject matter being presented to the user, etc.

As users interact with an online service, it is important for the online service to be able to identify a topic or context of the interaction. Based on the identified topic, the online service can place relevant advertisements. In identifying context or topics, these online services typically make use of a hierarchal taxonomy of interests, mapping the activity or context of the user to an interest node in the taxonomy. For example, at least one online service utilizes an established taxonomy that includes approximately 11,000 interest nodes, each node corresponding to a topic or interest. In the scope of everything that a user might do as part of the interaction with the online service, the taxonomy of interests is quite small, so it is important to correctly map a user's interaction to a corresponding topic within the taxonomy.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" regarding multiple items should be viewed as meaning either or both items.

An interest taxonomy comprises interest nodes, typically hierarchically arranged. For example, a hierarchical interest taxonomy may include interest nodes "feline," "canine," and "rodent," each of which being child nodes of interest node "mammal." Interest nodes of an interest taxonomy are generally expressed as textual content, i.e., their labels. Thus, when a user's interaction comprises the user posting an image, mapping the image to an interest becomes a challenge.

One way to determine one or more interests for user-posted content is by way of embedding vectors, particularly when the content from which an embedding vector has been generated is already associated with one or more interest nodes in an interest taxonomy. By way of definition and as those skilled in the art will appreciate, an embedding vector for an item of content is an array/vector of values corresponding to various aspects or features of the item of content. Typically, each of the various elements of embedding vectors is a floating-point value, e.g., a 32- or 64-bit floating point value that represents some aspect of the input item of content as determined by an embedding vector generator. In some instances, however, all or some of the values may be integer values (signed or unsigned), and in some instances the values may be binary values. A typical length of an embedding vector, i.e., the number of elements, can vary greatly though, in various embodiments, an embedding vector comprises 128 elements, each element comprising a 16-bit signed floating-point value. Additionally, embedding vector generators are type-specific, meaning that these generators work only for the input type on which they are training. An embedding vector generator trained to generate embedding vectors for images generates nonsensical data for input content of other types, e.g., audio content or text content.

Another way user-posted content items can be mapped to interest nodes in an interest taxonomy is through textual content that may be associated with the user-posted content. For example (a common example, in fact), a user of an online service may post an image, either as a single post or as an element of a collection or group of images. Additionally, the user will often associate a textual caption to the posted image, as well as provide a larger description or discussion of the posted image. Ubiquitously, images have a text-based filename that is often descriptive of the image. Still further, if the user were to post the image as an element of a collection of images, the collection will typically include a collection title, image annotations and/or captions, as well as descriptions and/or other textual comments. If an image is posted with an associated web page, the associated web page will also have relevant content. In short, and according to aspects of the disclosed subject matter, when a user posts an image to an online service, there is often one or more items of textual content that could be utilized to map the image to one or more interest nodes in the interest taxonomy.

While textual content is frequently part of a user's post to an online service, determining an exact match between textual content associated with the user's post and the textual labels of the interest nodes of the interest taxonomy is uncommon. Generally, it is far more likely that the textual content of a user's post does not exactly match any text label of any interest node in the interest taxonomy. As a result, often the online service faces the challenge of associating or mapping the user's text data to an interest node that most closely matches the context/interest expressed by the text data. Aspects of the disclosed subject matter are directed to associating text content to an interest node that most likely matches the context/interest expressed in the text content. Various aspects of the disclosed subject matter are directed to identifying or "mapping" text data associated with, or being a part of, the posted content to one or more likely interest nodes of an interest taxonomy. In this context, the text data of a user's post to an online service is referred to as "unmapped text content."

Figure 1:
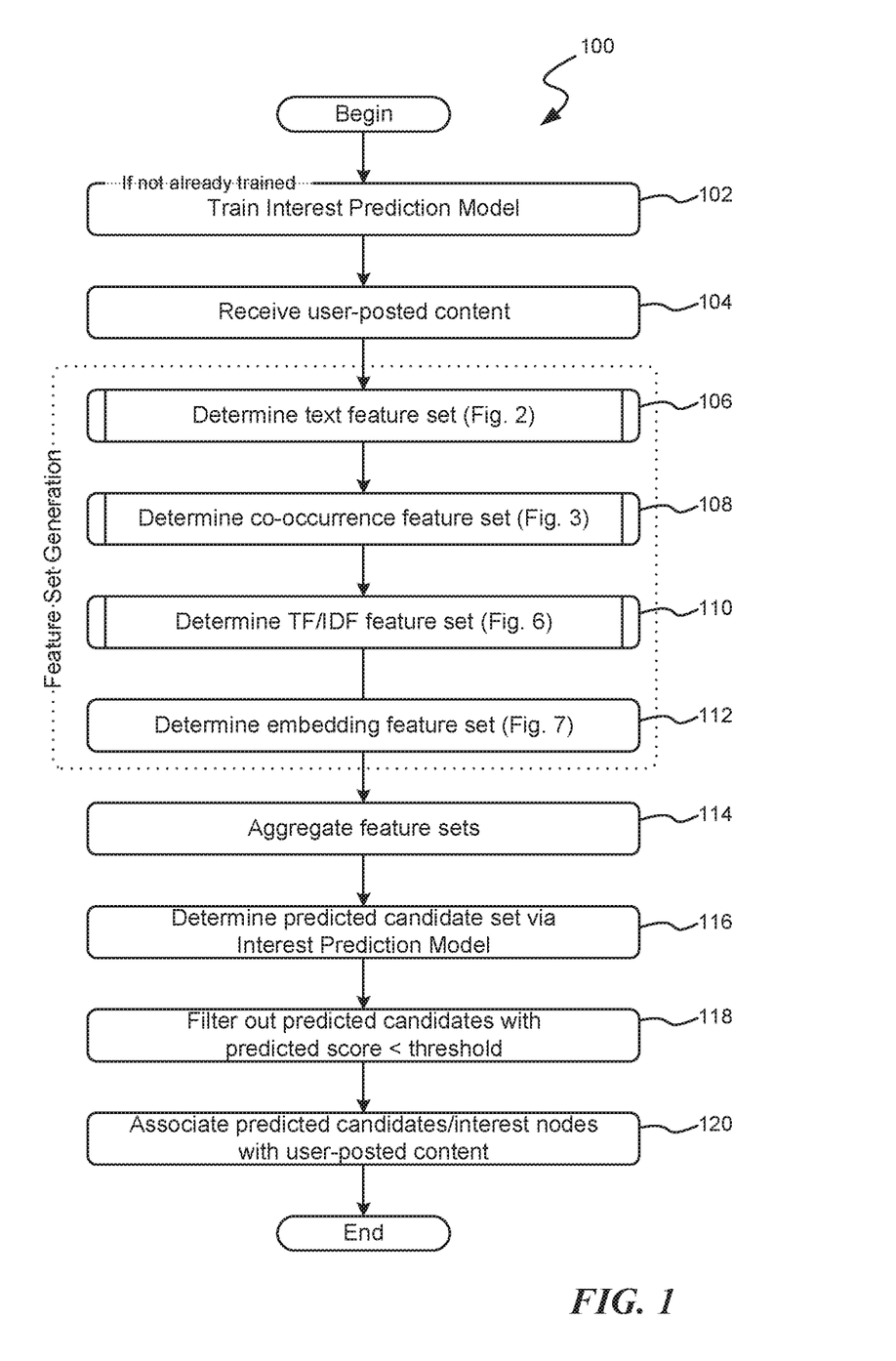
FIG. 1 is flow diagram illustrating an exemplary routine suitable for determining a set of candidate interest nodes of an existing taxonomy for a user-posted content item, in accordance with aspects of the disclosed subject matter.

To illustrate the mapping of a user's post to an online service by way of mapping the unmapped text content to an interest node of an interest taxonomy, reference is made to the figures. FIG. 1 is flow diagram illustrating an exemplary routine 100 suitable for determining a set of candidate interest nodes of an existing taxonomy for a user-posted content item, in accordance with aspects of the disclosed subject matter.

Beginning at block 102, an interest prediction model—a machine learning model—is trained if this model has not already been trained. As those skilled in the art will appreciate, the interest prediction model is trained according to a training set of data suitably configured to provide the information on which the interest prediction model can accurately predict a set of candidate interest nodes in an interest taxonomy from one or more candidate feature sets of candidate interest nodes, as will be discussed in greater detail below.

According to various embodiments of the disclosed subject matter, the interest prediction model is a form of a gradient boost decision tree model, as is known in the art. The input data (including the training data), as will be discussed below, comprises interest node candidates generated by various candidate generation modules or functions, including a module to determine candidate interest nodes according to any one or more of a text-based matching between the unmapped text data and a lexical expansion of the text labels of interest nodes in the interest taxonomy, a module to determine candidate interest nodes according to co-occurrence of the unmapped text data and content items mapped to interest nodes, a module to determine candidate interest nodes according to a term frequency/inverse document frequency (TF/IDF) analysis of the unmapped text content, and a module to determine one or more interest nodes according to embedding vector generation of both text and visual content associated with the unmapped item.

After having established a trained interest prediction model, at block 104 user-posted content is received. This user-posted content represents the content to be mapped to one or more interest nodes of the interest taxonomy. At block 106, a candidate text feature set is determined for the input text, where this text feature set comprises a set of interest node candidates in the interest taxonomy. Details of determining a candidate text feature set is set forth below in the discussion of FIG. 2.

Figure 2:
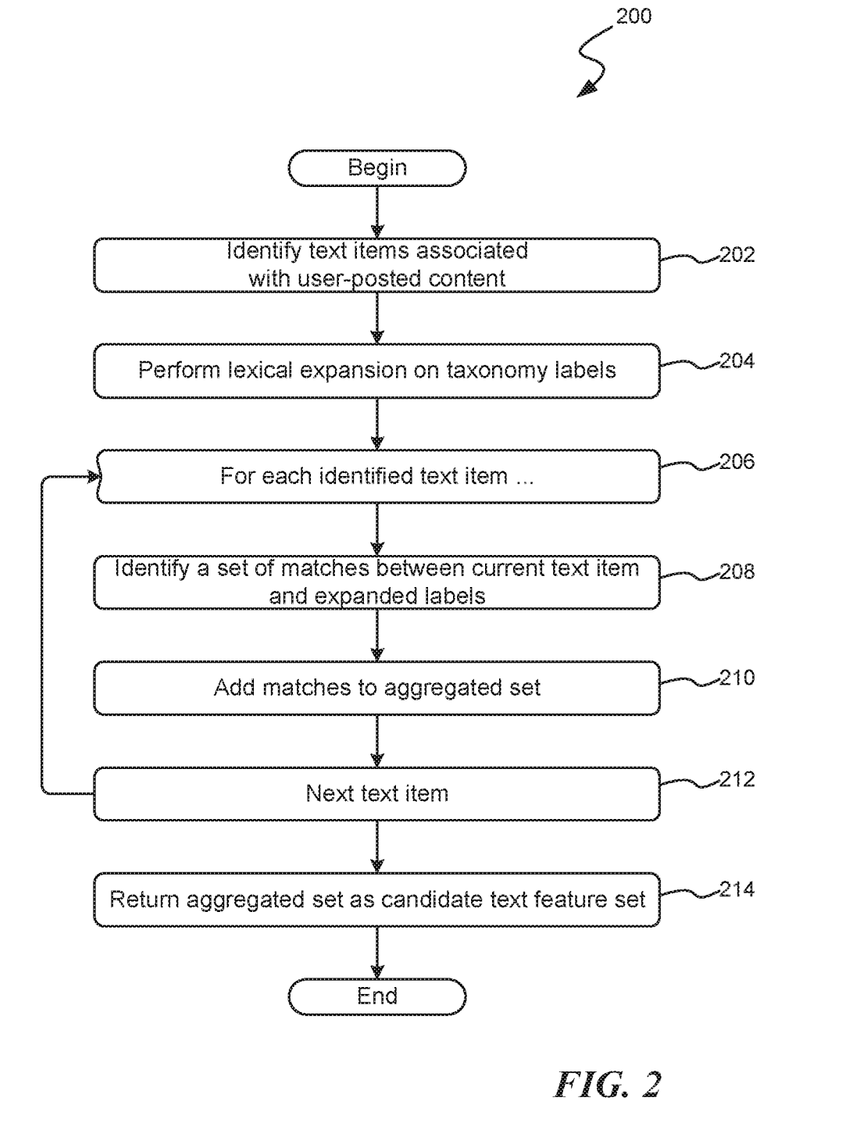
FIG. 2 is a flow diagram illustrating an exemplary routine suitable for determining a text-based feature set of candidate interest nodes of an existing interest taxonomy for a user-posted content item, in accordance with aspects of the disclosed subject matter.

Turning to FIG. 2, this figure is a flow diagram illustrating an exemplary routine 200 suitable for determining a text-based feature set of candidate interest nodes of an existing interest taxonomy for a user-posted content item, in accordance with aspects of the disclosed subject matter. Beginning at block 202, text items, i.e., unmapped text items, associated with the user-posted content are identified. These text items correspond to words and/or phrases identified as being associated with the user-posted content including by way of illustration and not limitation, a content title, captions, annotations, comments and/or descriptions, as well as collection titles, captions, annotations, comments and/or descriptions if posted within a content collection.

At block 204, a lexical expansion of the interest taxonomy is conducted. More particularly, the lexical expansion is a lexical expansion of the text-based labels of the interest nodes of the interest taxonomy. This lexical expansion includes, for the interest nodes of the interest taxonomy, modifying the text label of an interest node in a variety of manners, thereby generating an expanded set of text labels for the interest node. These modifications may include, by way of illustration and not limitation, modifying the text label to form common misspellings, modifying the text label to include (or exclude) apostrophes and/or hyphens, modifying the text label to add or remove suffixes, and the like. For each interest node, the result of the lexical expansion is a substantially increased number of text labels associated with each interest node, thereby enhancing the likelihood of a match between the input text items and an interest node.

At block 206, an iteration is begun to iterate through and process each of the identified text items. At block 208, as part of the iteration, a set of matches (if any) between the currently iterated text item and the expanded set of interest node labels is identified. This set may include zero or more matches. Based on any matches with the expanded text labels, at block 210, the corresponding interest nodes are added as candidate interest nodes to a text features set for evaluation (as described in routine 100 of FIG. 1) by the interest prediction model. Information regarding the basis (i.e., a match to a lexical expansion of the interest node) may also be included. This allows for auditing how the user's posted content becomes associated with an interest node of an interest taxonomy.

At block 212, if there are additional text items to process, the routine 200 returns to block 206 where the next text item is selected and processed. Alternatively, after all text items have been processed, the routine 200 proceeds to block 214. At block 214, the aggregated set of candidate interest nodes is returned as a candidate text feature set. Thereafter, routine 200 terminates.

Returning to routine 100 of FIG. 1, after determining the text feature set, at block 108 a co-occurrence feature set is determined. This co-occurrence feature set, i.e., a set of candidate interest nodes, is determined according to the co-occurrence of the input text and other textual content on a content item and/or a group of content items in the document corpus. Determining a co-occurrence feature set is set forth below in the discussion of FIG. 3.

Figure 3:
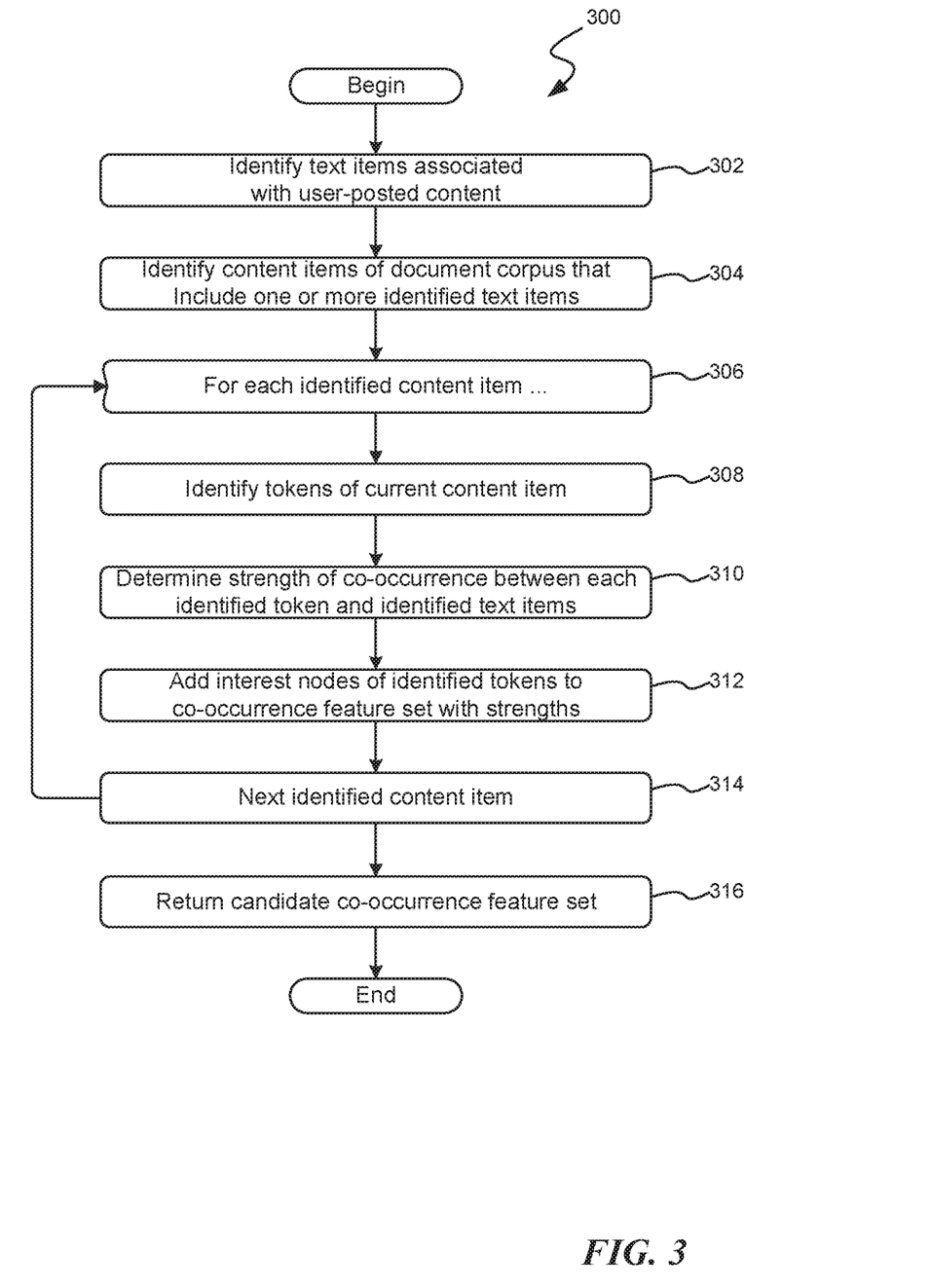
FIG. 3 is a flow diagram illustrating an exemplary routine suitable for determining a co-occurrence feature set of candidate interest nodes of an existing taxonomy for a user-posted content item, in accordance with aspects of the disclosed subject matter.

Turning to FIG. 3, this figure is a flow diagram illustrating an exemplary routine 300 suitable for determining a co-occurrence feature set of candidate interest nodes of an existing taxonomy for a user-posted content item, in accordance with aspects of the disclosed subject matter. Beginning at block 302, text items, i.e., unmapped text items, associated with the user-posted content are identified. In similar manner to 202 of routine 200, these text items correspond to words and/or phrases identified as being associated with the user-posted content including by way of illustration and not limitation, a content title, captions, annotations, comments and/or descriptions, as well as collection titles, captions, annotations, comments and/or descriptions if posted within a content collection.

At block 304 content items of a document corpus are identified, where these content items include one or more of the identified text items from the user's content item. In this context, "content items" of the document corpus include content items posted by users of the online service as well as collections of content items in which the content items may be posted.

At block 306, an iteration is begun to iterate through each of the identified content items. Thus, at block 308 and regarding a currently iterated content item, an identification is made of the tokens associated with the current content item. By way of definition, tokens are those words and/or phrases (textual content) that are mapped to an interest node in the interest taxonomy. These tokens are co-occurring tokens in that they co-occur with at least one of the text items of the user's posted content item.

Figure 4:
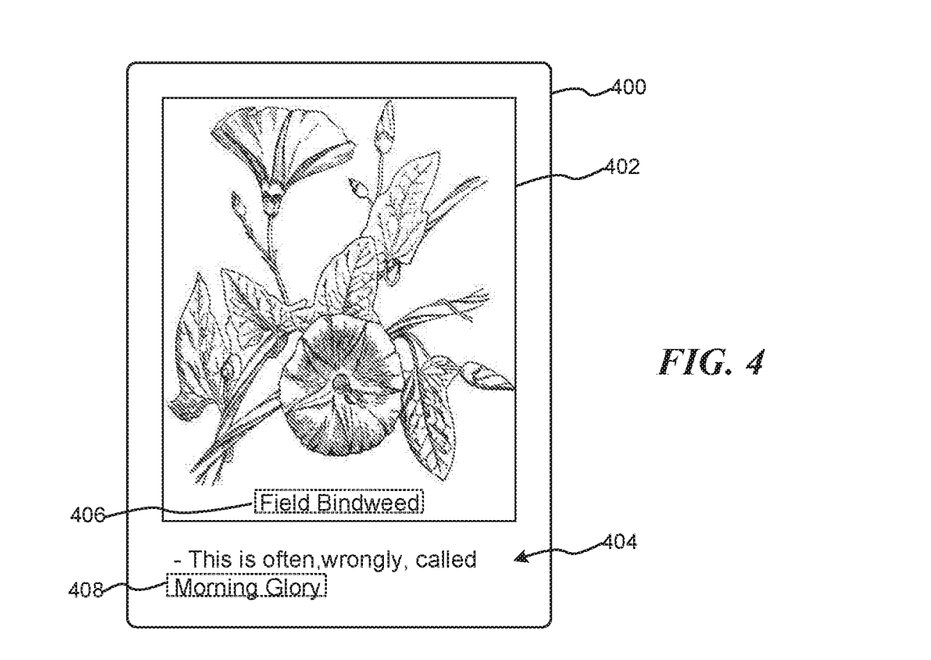
FIG. 4 is a pictorial diagram illustrating an example of a user's posted content item, in accordance with aspects of the disclosed subject matter.
Figure 5:
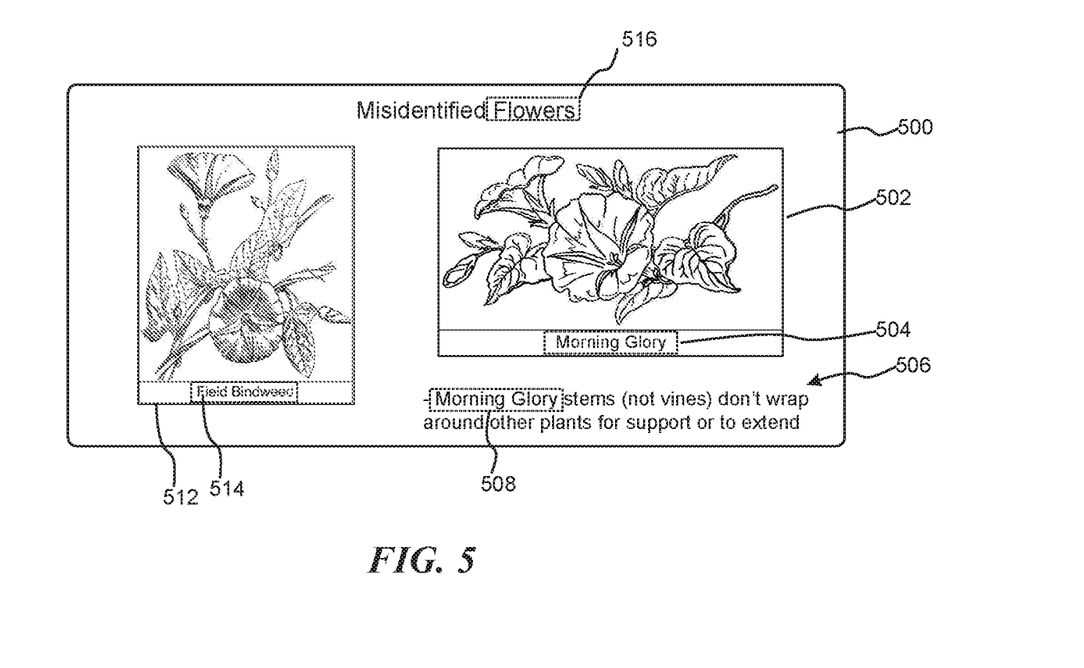
FIG. 5 is a pictorial diagram illustrating a group or collection of content items, in accordance with aspects of the disclosed subject matter.

To illustrate co-occurrence, reference is further made to FIGS. 4 and 5. FIG. 4 is a pictorial diagram illustrating an example of a user's posted content item 400, in accordance with aspects of the disclosed subject matter. As shown in this example, the content item 400 includes an image 402, a caption 406, and user comments 404. Assume further, as part of identifying text items, both the caption 406 ("Field Bindweed") and the text item 408 ("Morning Glory") are identified.

In contrast to FIG. 4, FIG. 5 is a pictorial diagram illustrating a group or collection 500 of content items, in accordance with aspects of the disclosed subject matter. As shown in FIG. 5, the exemplary collection 500 includes at least a title, "Misidentified Flowers," and content items 512 and 502. Content item 512 includes a caption 514 "Field Bindweed," while content item 502 includes a caption 504 "Morning Glory" and posted comments 506. For purposes of this example, assume that the identified tokens include token 516 "Flower" and token 508 "Morning Glory," each token being mapped to an interest node in the interest taxonomy corresponding to "Flowers." In this instance/example, the interest node of both tokens, "Flowers," potentially becomes a candidate interest node.

With reference again to routine 300 of FIG. 3, at block 310, a determination of the co-occurrence strength of each token and one or more corresponding text items is determined. This may be based on the frequency of the co-occurrence of the token and corresponding text items on the currently iterated content item, the semantic location of the co-occurrence between a token and text items (e.g., as a title, caption, annotation, file name, etc.), the predominance of the token to the current content item, and the like. At block 312, the interest nodes associated with the tokens are added to a co-occurrence feature set along with the determined co-occurrence strengths. Optionally, only interest nodes identified from tokens with a threshold level of co-occurrence strength are added to the co-occurrence feature set.

At block 314, if there are additional content items to process in the iteration, the routine 300 returns to block 306 to process a next content item. Alternatively, at block 314, if there are no more content items to process, the routine 300 proceeds to block 316.

At block 316, the candidate co-occurrence feature set is returned. Thereafter, the routine 300 terminates.

Returning to routine 100 of FIG. 1, after having generated the candidate co-occurrence feature set, at block 110 a TF/IDF (term frequency/inverse document frequency) feature set of candidate interest nodes is determined. A more detailed description of determining the TF/IDF feature set is made below in routine 600 of FIG. 6.

Figure 6:
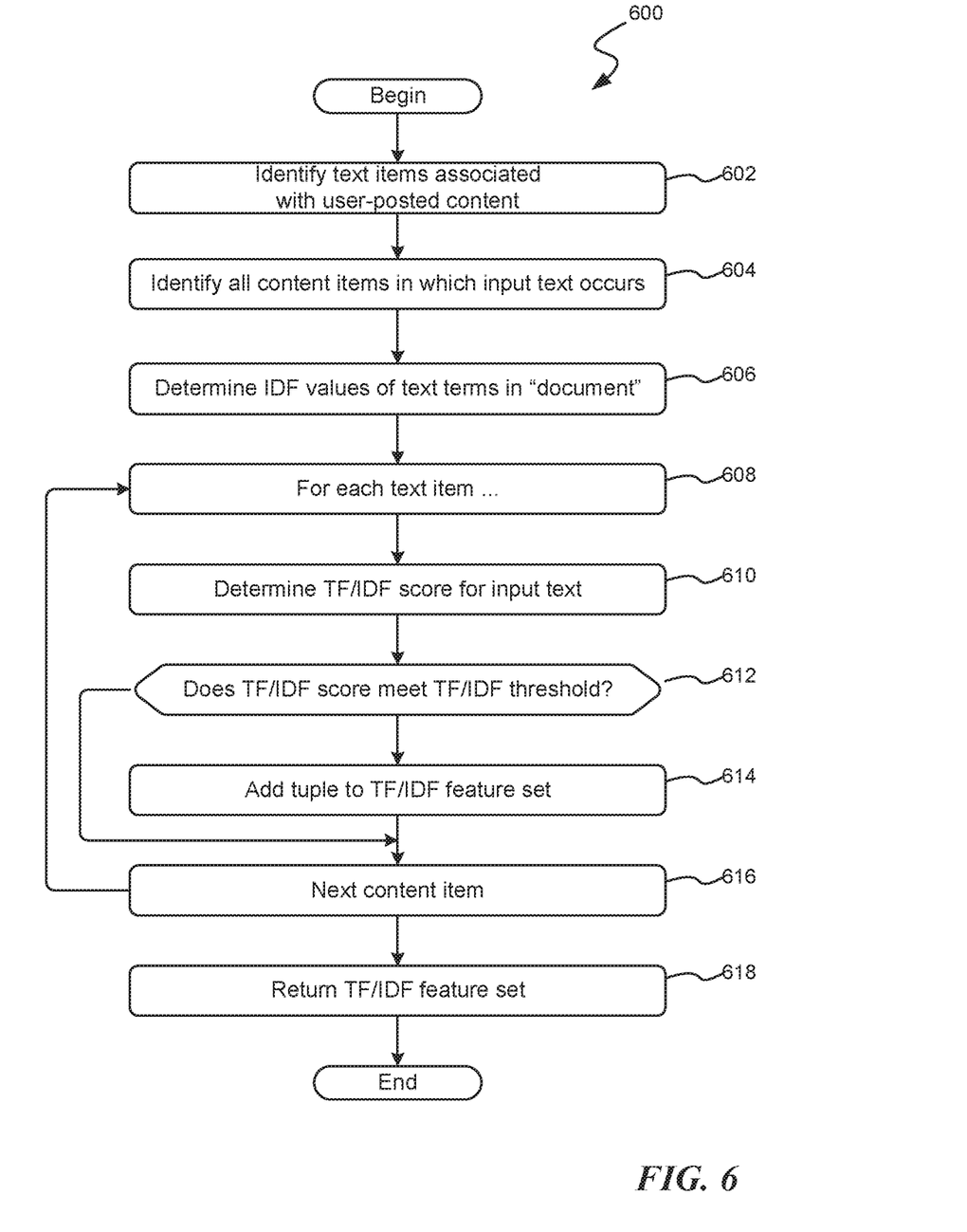
FIG. 6 is a flow diagram illustrating an exemplary routine suitable for determining a TF/IDF feature set of candidate interest nodes of an existing interest taxonomy, in accordance with aspects of the disclosed subject matter.

As indicated above, FIG. 6 is a flow diagram illustrating an exemplary routine 600 suitable for determining a TF/IDF feature set of candidate interest nodes of an existing interest taxonomy, in accordance with aspects of the disclosed subject matter. Beginning at block 602, text items associated with the user-posted content are identified. At block 604, all content items (including individually posted content items and collections of content items) that include the input text are identified. This collection of items is then the "document" for determining the "IDF" portion of TF/IDF.

At block 606, an analysis is conducted on the identified text items associated with the content item to determine the frequencies of the various text terms within this "document." As those skilled in the art will appreciate, this forms a "TF" or "term frequency" value for each of the identified text items.

At block 608, an iteration is begun to iterate through each of the identified text items (with associated term frequency values) in order to determine a TF/IDF score for the identified text items. Thus, at block 610, a TF/IDF score is determined for the currently iterated text item (based on the term frequency associated with the text item and the inverse document frequency of the text item as found in the "document.") At block 612, a determination is made as to whether the TF/IDF score for the currently iterated text item meets or exceeds a predetermined TF/IDF threshold value. If the TF/IDF score of the currently iterated text item does not at least meet the TF/IDF threshold value, block 614 is skipped—proceeding directly to block 616. Alternatively, if the TF/IDF score of the currently iterated text item at least meets, or exceeds, the TF/IDF threshold value, at block 614 the text item and it's TF/IDF score are added to a TF/IDF feature set, indicative of the text item being an important text item.

At block 616, if there are additional text items to process, the routine 600 returns to block 608 where a next text item in the iteration is selected for processing, as described in block 610-614. Alternatively, if there are no additional text items to process, the routine 600 proceeds to block 618. At block 618, the TF/IDF feature set is returned. Thereafter, the routine 600 terminates.

Returning to routine 100, after determining the elements of the TF/IDF feature set, at block 112, an embedding feature set is determined. In contrast to the feature sets already discussed, the embedding feature set utilizes both textual and non-textual content to determine a set of one or more candidate interest nodes of the interest taxonomy. As will be readily appreciated, since the interest nodes in the interest taxonomy are represented at text labels, utilizing both textual and non-textual content (e.g., images, videos, audio, etc.), directly comparing an embedding vector generated of the user-posted content to embedding vectors of the interest nodes in the interest taxonomy cannot be directly made. Indeed, these respective embedding vectors project into entirely distinct embedding spaces, something akin to comparing apples to oranges.

Figure 7:
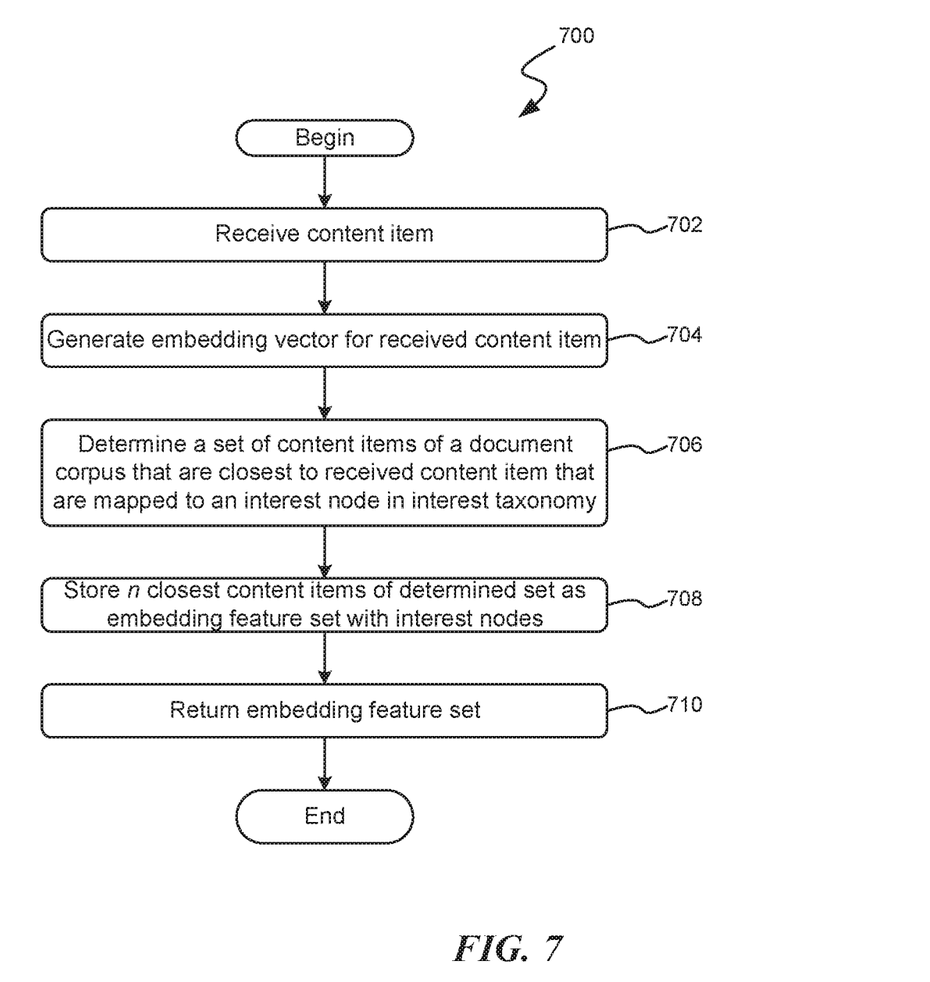
FIG. 7 is a flow diagram illustrating an exemplary routine suitable for determining an embedding feature set of candidate interest nodes for user-posted content, in accordance with aspects of the disclosed subject matter.

Turning to FIG. 7, FIG. 7 is a flow diagram illustrating an exemplary routine 700 suitable for determining an embedding feature set of candidate interest nodes for user-posted content, in accordance with aspects of the disclosed subject matter. Beginning at block 702, the user-posted content item is received. According to aspects of the disclosed subject matter, this received content item includes both textual and non-textual content (e.g., an image, video content, audio content, etc.). At block 704, an embedding vector is generated for the received content item. This embedding vector is generated according to both the textual and non-textual content of the received content item.

As mentioned above, since the interest nodes in the interest taxonomy are represented as text labels, a direct comparison of the embedding vector generated from the received content item to the embedding vectors of the interest nodes in the interest taxonomy cannot be directly made. Instead, at block 706, a set of content items of a document corpus is identified. According to aspects of the disclosed subject matter, this set of content items is identified according to their embedding vectors (generated into the same embedding space as the embedding vector of the received content item). Additionally, this set of content items is identified due to their similarity as determined by the closeness of their embedding vectors projected into the embedding vector space to the embedding vector of the received content item. As those skilled in the art will appreciate, a cosine similarity function may be used to determine similarity or closeness between embedding vectors in the embedding vector space. Additionally, the use of techniques such as Locality Sensitive Hashing or LSH may be used to identify one or more "buckets" of content items within the document corpus that are most likely to be similar to the received content item, thereby enhancing processing efficiencies.

After identifying those content items from the document corpus that are viewed as at least similar (e.g., whose projected similarity exceeds some predetermined threshold), at block 708, the n-most similar content items are selected and stored as elements of the embedding feature set. According to aspects of the disclosed subject matter, the interest nodes of each of the content items stored in the embedding feature set may also be added to the feature set. At block 710, the embedding feature set is returned and the routine 700 terminates.

Returning to routine 100, at block 114, the feature sets are aggregated to form input data suitably configured for a trained machine learning model or, more specifically, for an Interest Prediction Model. At block 116, a predicted candidate set of interest nodes with corresponding scores, the scores indicating the likelihood that a given candidate interest node is an actual interest node of the content item, is determined by the Interest Prediction Model based on the aggregated feature sets. At block 118, candidate interest nodes whose corresponding predicted scores fall below a predetermined threshold are filtered out of the candidate set, leaving only those candidate interest nodes whose corresponding predicted score meets or exceeds this predetermined threshold. At block 120, the remaining candidate interest nodes are then associated with the user-posted content item as it's interest nodes. Thereafter, routine 100 terminates.

While routine 100 lists the text feature set, the co-occurrence feature set, the TF/IDF feature set, and an embedding feature set as input elements (separately or in aggregation) to an Interest Prediction Model which, in turns, generates a candidate set of interest nodes, it should be appreciated that additional feature sets may also be determined. By way of illustration and not limitation, embedding vectors for the identified text items associated with the user-posted content item (as discussed in routines 200 and 300) may be generated, a text embedding feature set including the m closest text items in a corpus of text content, as determined by their embedding vectors, could be provided to the Interest Prediction Model as an input item.

Regarding routines 100, 200, 300, 600 and 700 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing system described in FIG. 8 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer executable instructions stored by computer readable media, also referred to as computer readable storage media, which (for purposes of this disclosure) are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 8:
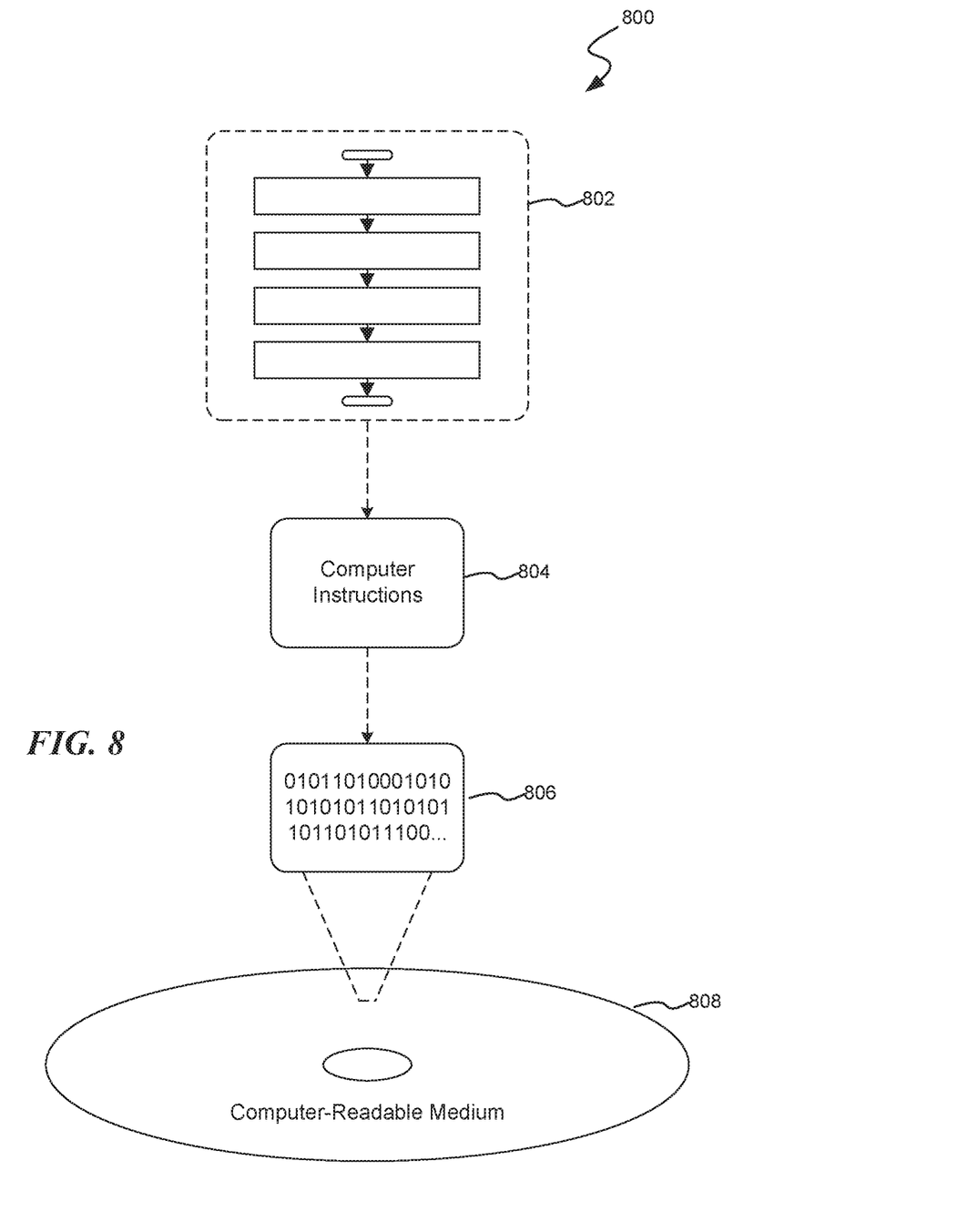
FIG. 8 is a block diagram illustrating an exemplary computer-readable medium with computer-executable instructions, formed in accordance with aspects of the disclosed subject matter.

Regarding computer readable media, FIG. 8 is a block diagram illustrating an exemplary computer-readable medium bearing instructions for generating and associating interest nodes of an interest taxonomy with a user-posted content item, in accordance with aspects of the disclosed subject matter. More particularly, the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of exemplary routines 200-300 and 600-700, for example. In another such embodiment, the processor-executable instructions 804 may be configured to implement a system on a computing device, such as at least some of the exemplary, executable components of computing device 900 of FIG. 9, as described below. Many such computer readable media may be devised, by those of ordinary skill in the art, which are configured to operate in accordance with the techniques presented herein.

Figure 9:
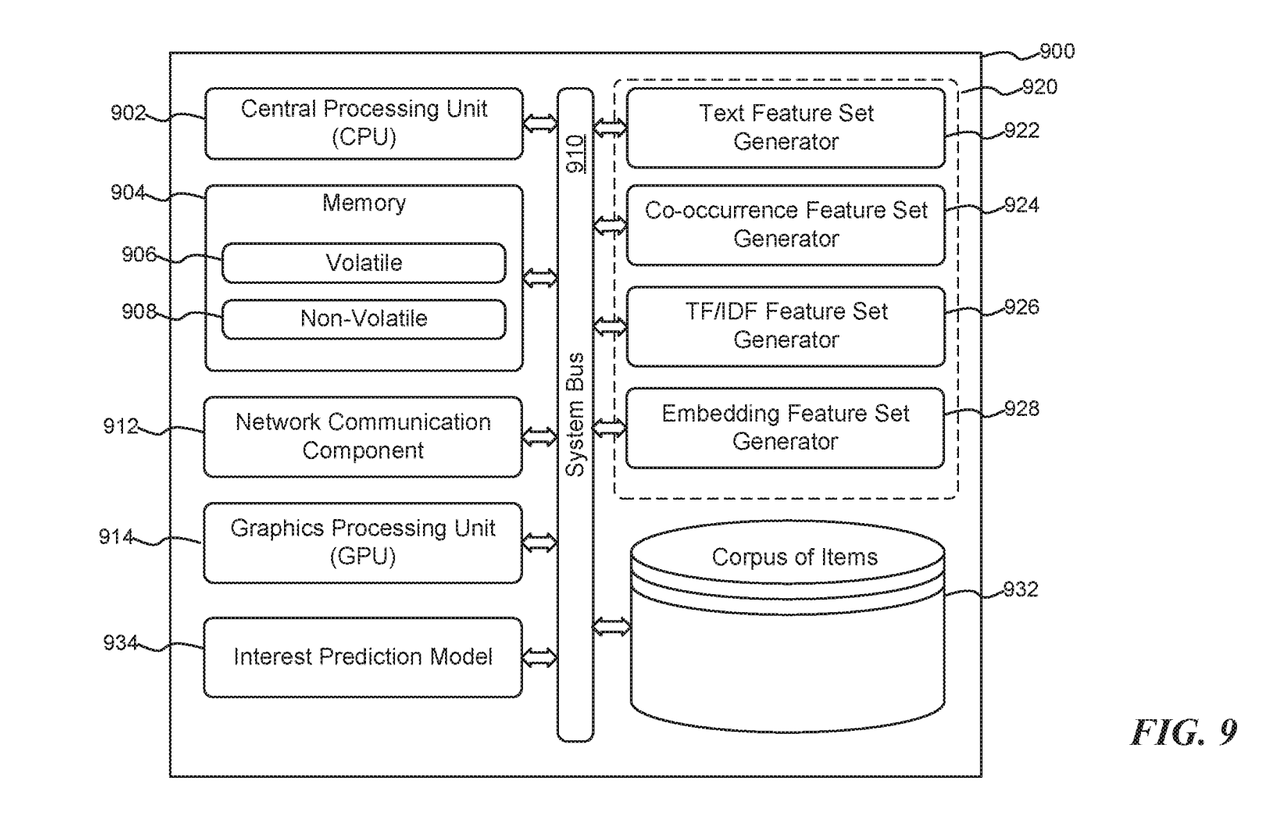
FIG. 9 is a block diagram illustrating an exemplary computer system suitably configured to associate interest nodes of an interest taxonomy with user-posted content in accordance with aspects of the disclosed subject matter.

Turning to FIG. 9, FIG. 9 is a block diagram illustrating exemplary components of a computer system 900 configured to implement a service for generating and associating interest nodes of an interest taxonomy with a user-posted content item, in accordance with aspects of the disclosed subject matter. As is typical of most computing devices, the computing system 900 includes one or more central processing units (or CPUs), such as CPU 902, and further includes at least one memory 904. The CPU 902 and memory 904, as well as other components of the computing system, are interconnected by way of a system bus 910.

As will be appreciated by those skilled in the art, the memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. In general, RAM and CPU cache memory are examples of volatile memory 906 whereas ROM, solid-state memory devices, memory storage devices, and/or memory cards are examples of non-volatile memory 908.

As will be further appreciated by those skilled in the art, the CPU 902 executes instructions retrieved from the memory 904, from computer readable media, such as computer readable media 808 of FIG. 8, and/or other executable components in carrying out the various functions of the disclosed subject matter. The CPU 902 may be comprised of any of a number of available processors such as single-processor, multi-processor, single-core units, and multi-core units, which are well known in the art.

Further still, the illustrated computing system 900 typically also includes a network communication interface 912 for interconnecting this computing system with other devices, computers and/or services over a computer network. The network communication interface 912, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 912, is typically comprised of hardware and/or firmware components (and may also include or comprise executable software components) that transmit and receive digital and/or analog signals over a transmission medium (i.e., the network).

The illustrated computing system 900 also includes a graphics processing unit (GPU) 914. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data. Indeed, one or more GPUs, such as GPU 914, are often viewed as essential processing components when conducting machine learning techniques. Also, and according to various embodiments, while GPUs are often included in computing systems and available for processing convolutions of machine learning models, such as GPU 914 of computing system 900, multiple GPUs are also often deployed as online GPU services or farms and machine learning processing are advantageously directed to conducting the various layers/convolutions of training a neural network.

The computing system 900 further includes a system-executable interest node generation component 920. In execution, the interest node generation component 920 is configured to predictively generate interest nodes for user-posted content, as at least partially described above regarding routine 100 of FIG. 1. Indeed, in response to user-posted content, the interest node generation component 920 generates various feature sets for the user-posted content, aggregates the various feature sets as input data and, by way of a trained interest prediction model, generates and associates a set of likely interest nodes to the user-posted content, along with predicted values indicating how likely a given interest node relates to the user-posted content.

The interest node generation component 920 includes a system-executable text feature set generator 922. As described in the discussion of routine 200 of FIG. 2, the text feature set generator 922, in execution on the computer system 900, processes textual content associated with the user-posted content, generates an expanded set of text labels for each of the interest nodes of an interest taxonomy, and determines candidate interest nodes according to text-based matching techniques.

The interest node generation component 920 also includes a system-executable co-occurrence feature set generator 924. As described in the discussion of routine 300 of FIG. 3, the co-occurrence feature set generator 924, in execution on the computer system 900, determines a set of content items (from a corpus of content items, such as found in data store 932) in which text items from the user-posted content co-occur. Based on the identification of this co-occurrence, interest nodes associated with the content items of the set of content items are aggregated and stored as the co-occurrence feature set.

The interest node generation component 920 still further includes a system-executable TF/IDF feature set generator 926. As described in the discussion of routine 600 of FIG. 6, the TF/IDF feature set generator 926, in execution on the computer system 900, determines a set of TF/IDF scores for each of the text items associated with the user-posted content. This information is aggregated into the TF/IDF feature set for use in determining likely interest node candidates for the user-posted content.

The interest node generation component 820 may further include a system-executable content embedding feature set generator 928. As described in the discussion of routine 700, the content embedding feature set generator 928, in execution on the computer system 900, generates an embedding vector for the user-posted content item and determines the n closest content items in a corpus of content items, as determined by their embedding vectors, and provides this information as a feature set for the Interest Prediction model 934.

Regarding the various components of the exemplary computing device 900, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for matching a content item to an interest node in an interest taxonomy, the computer-implemented method comprising:
   maintaining a corpus of content items and an interest node taxonomy, wherein the interest node taxonomy comprises a plurality of interest nodes organized in a hierarchical organization, and wherein content items of the corpus of content items are associated with one or more interest nodes of the interest node taxonomy;
   receiving a content item including a plurality of text items to be added to the corpus of content items;
   determining, for the received content item, at least one feature set according to aspects of the received content item and the interest node taxonomy, the at least one feature set including a text feature set that includes an aggregated set of interest nodes of the interest node taxonomy, and wherein determining the text feature set includes:
     performing a lexical expansion of text labels of the plurality of interest nodes in the interest node taxonomy, resulting in expanded text labels for at least some of the plurality of interest nodes in the interest node taxonomy;
     identifying matches between the expanded text labels and the plurality of text items included with the received content item; and
     aggregating interest nodes of the plurality of interest nodes that are associated with the identified matches as the aggregated set of interest nodes of the interest node taxonomy in the text feature set;
   providing the at least one feature set of the received content item, including the text feature set, to an interest prediction model, wherein the interest prediction model is a trained machine learning model trained to generate a list of candidates for an input content item according to one or more feature sets of the input content item;
   obtaining a set of predicted interest node candidates for the received content item from the interest prediction model; and
   associating at least some of the predicted interest node candidates with the received content item as interest nodes for the received content item in the interest node taxonomy.

2. The computer-implemented method of claim 1, further comprising:
   determining an actual text label of the interest node of the matching text label to be a current text item; and
   storing the actual text label of the interest node with the current text item in the text feature set.

3. The computer-implemented method of claim 1, wherein performing the lexical expansion of text labels of the plurality of interest nodes in the interest node taxonomy resulting in the expanded text labels for at least some of the plurality of interest nodes in the interest node taxonomy comprises one or more of:

modifying an actual text label of the interest node to form one or more common misspellings of the actual text label;

modifying the actual text label of the interest node to include or exclude apostrophes and/or hyphens; and modifying the actual text label of an interest node to add or remove one or more suffixes.

4. The computer-implemented method of claim 1, wherein:

the at least one feature set of the received content item includes a co-occurrence feature set; and determining the co-occurrence feature set of the received content item comprises:

identifying a set of content items in a document corpus that includes one or more of the plurality of text items associated with the received content item; and for each content item of the set of content items:

identifying a token included in a content item of the set of content items, each token comprising a text item being mapped to an interest node of the interest node taxonomy;

associating a mapped interest node of the interest node taxonomy of the token to the received content item; and storing the association of the received content item and the mapped interest node in the co-occurrence feature set.

5. The computer-implemented method of claim 4, further comprising:

for each content item of the set of content items:

determining a strength of co-occurrence between the identified token and the text item; and storing the association of the received content item and the mapped interest node in the co-occurrence feature set with the determined strength of co-occurrence.

6. The computer-implemented method of claim 1, wherein:

the at least one feature set of the received content item includes a TF/IDF (term frequency/inverse document frequency) feature set; and determining the TF/IDF feature set of the received content item comprises:

identifying a set of content items in a document corpus that includes one or more of the plurality of text items associated with the received content item;

determining an IDF (inverse document frequency) value for each of the plurality of text items associated with the received content item; and for each text item of the plurality of text items associated with the received content item:

determining a TF/IDF value for a text item associated with the received content item;

associating the TF/IDF value with the text item associated with the received content item; and adding the TF/IDF value to the TF/IDF feature set for the received content item.

7. The computer-implemented method of claim 6, further comprising:

for each text item of the plurality of text items associated with the received content item:

determining whether the TF/IDF value meets or exceeds a predetermined threshold, wherein associating the TF/IDF value with the text item associated with the received content item and adding the TF/IDF value to the TF/IDF feature set for the received content item occur upon a determination that the TF/IDF value meets or exceeds the predetermined threshold.

8. The computer-implemented method of claim 1, wherein:

the at least one feature set of the received content item includes an embedding feature set; and determining the embedding feature set of the received content item comprises:

determining an embedding vector of the received content item;

determining a set of closest content items from the corpus of content items according to a similarity measure of embedding vectors measuring the similarity of the embedding vector of the received content item to embedding vectors of content items in the corpus of content items; and adding the set of closest content items from the corpus of content items to the embedding feature set.

9. The computer-implemented method of claim 1, further comprising:

determining a plurality of feature sets of the received content item according to aspects of the received content item; and providing the plurality of feature sets of the received content item to the interest prediction model.

10. The computer-implemented method of claim 9, wherein the plurality of feature sets of the received content item comprise any two or more of the text feature set, a co-occurrence feature set, a TF/IDF (term frequency/inverse document frequency) feature set, and an embedding feature set.

11. A computer-readable medium bearing computer-executable instructions which, when executed on a computing system comprising at least a processor configured to execute instructions from the medium, carry out a method for matching a content item to an interest node in an interest taxonomy, the method comprising:

maintaining a corpus of content items and an interest node taxonomy, wherein the interest node taxonomy comprises a plurality of interest nodes organized in a hierarchical organization, and wherein content items of the corpus of content items are associated with one or more interest nodes of the interest node taxonomy;

receiving a content item including a plurality of text items to be added to the corpus of content items;

determining, for the received content item, at least one feature set according to aspects of the received content item and the interest node taxonomy, the at least one feature set including a text feature set that includes an aggregated set of interest nodes of the interest node taxonomy, and wherein determining the text feature set includes:

performing a lexical expansion of text labels of the plurality of interest nodes in the interest node taxonomy, resulting in expanded text labels for at least some of the plurality of interest nodes in the interest node taxonomy;

identifying matches between the expanded text labels and the plurality of text items included with the received content item; and aggregating interest nodes of the plurality of interest nodes that are associated with the identified matches as the aggregated set of interest nodes of the interest node taxonomy in the text feature set;

providing the at least one feature set of the received content item, including the text feature set, to an interest prediction model, wherein the interest prediction model is a trained machine learning model trained to generate a list of candidates for an input content item according to one or more feature sets of the input content item;

obtaining a set of predicted interest node candidates for the received content item from the interest prediction model; and associating at least some of the predicted interest node candidates with the received content item as interest nodes for the received content item in the interest node taxonomy.

12. The computer-readable medium of claim 11, wherein determining at least one feature set of the received content item according to aspects of the received content item comprises determining at least one of the text feature set, a co-occurrence feature set, a TF/IDF (term frequency/inverse document frequency) feature set, and an embedding feature set.

13. The computer-readable medium of claim 11, wherein determining a co-occurrence feature set comprises:

identifying a set of content items in a document corpus that include one or more of the plurality of text items associated with the received content item; and for each content item of the set of content items:

identifying a token included in a content item of the set of content items, each token comprising a text item being mapped to an interest node of the interest node taxonomy;

associating a mapped interest node of the interest node taxonomy of the token to the received content item; and storing the association of the received content item and the mapped interest node in the co-occurrence feature set.

14. The computer-readable medium of claim 13, wherein determining a TF/IDF (term frequency/inverse document frequency) feature set comprises:

identifying a set of content items in a document corpus that include one or more of the plurality of text items associated with the received content item;

determining an IDF (inverse document frequency) value for each of the plurality of text items associated with the received content item; and for each text item of the plurality of text items associated with the received content item:

determining a TF/IDF value for a text item associated with the received content item;

associating the TF/IDF value with the text item associated with the received content item; and adding the TF/IDF value to the TF/IDF feature set for the received content item.

15. The computer-readable medium of claim 14, wherein determining an embedding feature set comprises:

determining an embedding vector of the received content item;

determining a set of closest content items from the corpus of content items according to a similarity measure of embedding vectors measuring the similarity of the embedding vector of the received content item to embedding vectors of content items in the corpus of content items; and adding the set of closest content items from the corpus of content items to the embedding feature set.

16. A computer system for matching a content item to an interest node in an interest taxonomy, the system comprising a processor and a memory, wherein the processor, in executing instructions stored in the memory, configures the computing system to:

maintain a corpus of content items and an interest node taxonomy, wherein the interest node taxonomy comprises a plurality of interest nodes organized in a hierarchical organization, and wherein content items of the corpus of content items are associated with one or more interest nodes of the interest node taxonomy;

receive a content item including a plurality of text items to be added to the corpus of content items;

determine, for the received content item, at least one feature set according to aspects of the received content item and the interest node taxonomy, the at least one feature set including a text feature set that includes an aggregated set of interest nodes of the interest node taxonomy, and wherein determination of the text feature set includes:

performing a lexical expansion of text labels of the plurality of interest nodes in the interest node taxonomy, resulting in expanded text labels for at least some of the plurality of interest nodes in the interest node taxonomy;

identifying matches between the expanded text labels and the plurality of text items included with the received content item; and aggregating interest nodes of the plurality of interest nodes that are associated with the identified matches as the aggregated set of interest nodes of the interest node taxonomy in the text feature set;

provide the at least one feature set of the received content item, including the text feature set, to an interest prediction model, wherein the interest prediction model is a trained machine learning model trained to generate a list of candidates for an input content item according to one or more feature sets of the input content item;

obtain a set of predicted interest node candidates for the received content item from the interest prediction model; and associate at least some of the predicted interest node candidates with the received content item as interest nodes for the received content item in the interest node taxonomy.

17. The computer system of claim 16, wherein the at least one feature set of the received content item comprises at least one of the text feature set, a co-occurrence feature set, a TF/IDF (term frequency/inverse document frequency) feature set, and an embedding feature set.

18. The computer system of claim 16, wherein the computer system is further configured to determine a plurality of feature sets of the received content item according to aspects of the received content item.

* * * * *